United States Patent [19]

Jung et al.

[11] Patent Number: 5,334,694

[45] Date of Patent: Aug. 2, 1994

[54] AROMATIC COPOLYAMIDES, PROCESSES FOR THEIR PREPARATION AND STRUCTURES FORMED THEREFROM

[75] Inventors: Holger Jung, Niedernhausen; Peter Klein, Wiesbaden; Karl Heinrich, Grossaitingen, all of Fed. Rep. of Germany

[73] Assignee: Hoechst Aktiengesellschaft, Frankfurt am Main, Fed. Rep. of Germany

[21] Appl. No.: 8,220

[22] Filed: Jan. 25, 1993

[30] Foreign Application Priority Data

Jan. 27, 1992 [DE] Fed. Rep. of Germany ....... 4202164

[51] Int. Cl.$^5$ .............................................. C08G 69/32
[52] U.S. Cl. .................................. 528/185; 528/183; 528/184; 528/191; 528/331; 528/340; 528/348
[58] Field of Search ............... 528/185, 183, 184, 191, 528/331, 340, 348

[56] References Cited

U.S. PATENT DOCUMENTS

| | | |
|---|---|---|
| 3,767,756 | 10/1973 | Blades . |
| 3,869,429 | 3/1975 | Blades . |
| 4,075,172 | 2/1978 | Ozawa et al. . |
| 4,355,151 | 10/1982 | Shimada et al. . |
| 4,413,114 | 11/1983 | Shimada et al. . |
| 4,931,533 | 6/1990 | Herold ............... 528/185 |
| 5,124,436 | 6/1992 | Hofheim et al. . |

FOREIGN PATENT DOCUMENTS

| | | |
|---|---|---|
| 0322837 | 7/1989 | European Pat. Off. . |
| 0445673 | 9/1991 | European Pat. Off. . |
| 3007063 | 8/1980 | Fed. Rep. of Germany . |

*Primary Examiner*—Morton Foelak

[57] ABSTRACT

Aromatic copolyamides are described which are soluble in organic polyamide solvents and which comprise the recurring structural units of the formulae Ia, Ib, Ic and Id $$[-OC-R^1-CO-NH-R^2-NH-] \quad \text{(Ia)},$$

$$[-OC-R^1-CO-NH-R^3-NH-] \quad \text{(Ib)},$$

$$[-OC-R^1-CO-NH-R^4-NH-] \quad \text{(Ic)},$$

$$[-OC-R^1-CO-NH-R^5-NH-] \quad \text{(Id)}$$

in which
$R^1$ and $R^2$ are mainly unsubstituted divalent aromatic radicals, the valency bonds of which are in the para-position or in a comparable coaxial or parallel position with respect to one another,
$R^3$ is a radical of the formula II

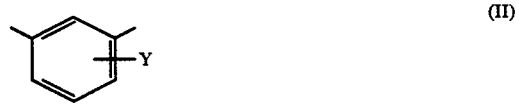

(II)

$R^4$ is a radical of the formula III $$-Ar^1-O-Ar^1-O-Ar^1- \quad \text{(III), and}$$

$R^5$ is a radical of the formula IV and/or V

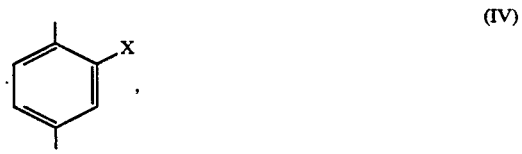

(IV)

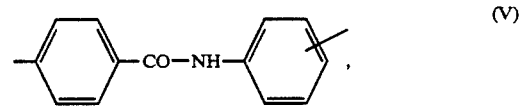

(V)

in which $Ar^1$ has one of the meanings defined for $R^2$, Y is hydrogen, a halogen atom, a lower alkyl group or a lower alkoxy group and X is a halogen atom, a lower alkyl group or a lower alkoxy group and the molar proportions of recurring structural units Ia, Ib, Ic and Id are fixed within selected limits. Shaped structures composed of the copolyamides according to the invention are distinguished by good mechanical properties.

10 Claims, No Drawings

AROMATIC COPOLYAMIDES, PROCESSES FOR THEIR PREPARATION AND STRUCTURES FORMED THEREFROM

The invention relates to novel aromatic copolyamides of the dicarboxylic acid-diamine type, which can be spun from their solutions in organic solvents, and also to shaped structures produced therefrom, such as filaments, fibers, fiber pulp, films, sheets and membranes which have a very high initial modulus (modulus of elasticity), and to processes for their preparation.

As is known, aromatic polyamides (aramids) are raw materials which have high stability to heat and high chemical stability as well as low combustibility. Thus, for example, fibers and films composed of such raw materials have very good mechanical properties, such as high strength and a high initial modulus (modulus of elasticity) and are very suitable for industrial fields of application—for example for reinforcing plastics or as filter materials.

It is known that filaments or fibers composed of polyaramides which have high strengths and a high initial modulus can be produced if the amide bonds to the aromatic nuclei are oriented coaxially or virtually parallel to one another, as a result of which rigid, rod-shaped polymer molecules are formed.

A typical polyamide of this type is, for example, poly(p-phenyleneterephthalamide). Filaments composed of this material are described, for example, in German Patent 22 19 703.

This polyamide has a number of advantages, but its preparation and its processing are very difficult. Because of the insolubility in polar organic solvents—and specifically also in the presence of inorganic salts, such as calcium chloride or lithium chloride, as solubilizing agents, this polymer will precipitate out of the reaction medium shortly after it has formed. It must be isolated, washed, dried and then redissolved in a spinning solvent. The preferred solvent for the preparation of the spinning solutions is concentrated sulfuric acid, which gives rise to particular problems in relation to handling (safety at work, corrosion) and waste disposal.

Attempts have therefore been made to circumvent these difficulties by developing copolyamides which have good solubility in the known amide solvents and which can also readily be spun and the filaments of which, after stretching, are distinguished by high strength values and initial moduli.

Thus, for example, copolyamides obtained from terephthalic acid, p-phenylenediamine and 3,4'-diaminophenyl ether, which in amide solvents yield isotropic solutions which can readily be spun, have been described in German Patent 25 56 883 and in German Offenlegungsschrift (German Published Specification) 30 07 063. As a result of very high stretching, the filaments acquire high strengths and moduli. Here it is the meta orientation and the oxygen atom which give rise to the increased solubility. However, there is still a need for aramids which can be processed from known a/hide solvents to give fibers which have high strengths and moduli and which can be processed in as economical a manner as possible to give shaped structures. In the preparation of multifilament yarns having predetermined fineness, the throughput through the plant and hence the cost-efficiency of the spinning process are determined mainly by the spinning speed and the maximum achievable stretching ratio. In contrast to the achievable stretching ratio, the spinning speed is in general independent of the composition of the polymers. To achieve a high throughput through the plant, it is therefore necessary to develop polymers which can be processed to give fibers which are distinguished by an achievable stretching ratio which is as high as possible.

The object on which the present invention is based is, therefore, to provide further aromatic copolyamides which are distinguished by good solubility in polyamide solvents and by good spinnability, which can be shaped to give highly stretchable structures and from which shaped structures with high strength and extension can be prepared.

The copolyamides according to the invention are characterized by the presence of selected aromatic diamine components in selected proportions.

The present invention relates to aromatic copolyamides which are soluble in organic polyamide solvents and contain the recurring structural units of the formulae Ia, Ib, Ic and Id $$[-OC-R^1-CO-NH-R^2-NH-] \quad (Ia),$$

$$[-OC-R^1-CO-NH-R^3-NH-] \quad (Ib),$$

$$[-OC-R^1-CO-NH-R^4-NH-] \quad (Ic),$$

$$[-OC-R^1-CO-NH-R^5-NH-] \quad (Id),$$

in which at least 90 mol % of all radicals $R^1$, with respect to the amount of these radicals in the copolymer, are a divalent aromatic radical, the valency bonds of which are in the para-position or in a comparable coaxial or parallel position with respect to one another, and which is optionally substituted by one or two inert radicals, and up to 10 mol % of all radicals $R^1$, with respect to the amount of these radicals in the copolymer, are a divalent aromatic radical, the valency bonds of which are in the meta-position or in a comparable angled position with respect to one another, and which is optionally substituted by one or two inert radicals, $R^2$ is a divalent aromatic radical, the valency bonds of which are in the para-position or in a comparable coaxial or parallel position with respect to one another, and which is optionally substituted by one or two inert radicals, and $R^3$ is a radical of the formula II

$R^4$ is a radical of the formula III, $$-Ar^1-O-Ar^1-O-Ar^1- \quad (III), \text{ and}$$

$R^5$ is a radical of the formula IV and/or V

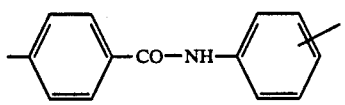

(V)

in which $Ar^1$ has one of the meanings defined for $R^2$, Y is hydrogen, a halogen atom, a lower alkyl group or a lower alkoxy group, X is a halogen atom, a lower alkyl group or a lower alkoxy group, and the proportion of recurring structural units Ia, Ib, Ic and Id, with respect to the sum of these structural units in the copolymer, is within the following limits:

recurring structural unit of the formula Ia: 30 to 70 mol %, preferably 40 to 60 mol %;
recurring structural unit of the formula Ib: 15 to 40 mol %, preferably 20 to 30 mol %;
recurring structural unit of the formula Ic: 5 to 30 mol %, preferably 10 to 20 mol %; and
recurring structural unit of the formula Id: 5 to 30 mol %, preferably 10 to 20 mol %.

If any substituents in the radicals $R^1$, $R^2$ or $A^1$ are inert radicals, they may be monovalent inorganic radicals, such as halogen, or monovalent, organic radicals, such as alkyl, alkoxy, bis-(N-alkyl)-amino, bis-(N-alkyl)-amido or nitrile. The term "inert radical" means that these substituents do not react under the preparation and processing conditions of the copolyamides according to the invention.

Preferred inert radicals are chlorine or $C_1$-$C_6$-alkyl or $C_1$-$C_6$-alkoxy.

Particularly preferred inert radicals are chlorine, methoxy or methyl.

If any radicals are divalent aromatic radicals the valency bonds of which are in the para-position or in a comparable coaxial or parallel position with respect to one another, said radicals are mononuclear or polynuclear aromatic hydrocarbon radicals or heterocyclic-aromatic radicals, which can be mononuclear or polynuclear. In the case of heterocyclic-aromatic radicals, said radicals comprise, in particular, one or two oxygen, nitrogen or sulfur atoms in the aromatic nucleus.

Polynuclear aromatic radicals can be fused with one another or linearly bonded to one another via C—C bonds or via a —CO—NH— group.

The valency bonds which are in a coaxial or parallel position with respect to one another are in opposing directions. An example of coaxial bonds in opposing directions are the biphenyl-4,4'-ene bonds. Examples of parallel bonds in opposing directions are the naphthalene 1,5- or 2,6-bonds, whilst the naphthalene 1,8-bonds are parallel and in the same direction.

Examples of preferred divalent aromatic radicals, the valency bonds of which are in the para-position or in a comparable coaxial or parallel position with respect to one another, are mononuclear aromatic radicals which have free valencies in the para-position with respect to one another, in particular 1,4-phenylene, or binuclear, fused aromatic radicals which have parallel bonds in opposing directions, in particular 1,4-, 1,5- and 2,6-naphthylene, or binuclear aromatic radicals which are linked via a C—C bond and have coaxial bonds in opposing directions, in particular 4,4'-biphenylene.

Particularly preferred radicals $R^1$, $R^2$ and $Ar^1$ are 1,4-phenylene.

If any radicals denote divalent aromatic radicals which have valency bonds which are in the meta-position or in a comparable angled position with respect to one another, said radicals are mononuclear or polynuclear aromatic hydrocarbon radicals or heterocyclic-aromatic radicals, which can be mononuclear or polynuclear. In the case of heterocyclic-aromatic radicals, said radicals comprise, in particular, one or two oxygen, nitrogen or sulfur atoms in the aromatic nucleus.

Polynuclear aromatic radicals can be fused with one another or can be linked to one another via C—C bonds or via bridge groups, such as, for example, —O—, —CH$_2$—, —CO—NH—, —S—, —CO— or —SO$_2$—.

Examples of polynuclear aromatic radicals in which the valency bonds are in an angled position comparable to the meta-position are 1,6-naphthylene, 2,7-naphthylene or 3,4'-biphenylene.

A preferred example of a mononuclear aromatic radical of this type is 1,3-phenylene.

The polyamides according to the invention may contain unsubstituted radicals and substituted radicals adjacent to one another in varying proportions.

The polyamide may contain one type or several types of substituted radicals $R^1$, $R^2$, $R^3$, $R^4$ and $R^5$; for example, it may contain exclusively methyl-substituted radicals or it may contain proportions of radicals having different alkyl substituents and/or having halogen substituents.

However, the polyamides according to the invention may also contain exclusively unsubstituted or substituted radicals $R^1$, $R^2$, $R^3$, $R^4$ and $R^5$. Preferred amides according to the invention are those which contain only unsubstituted radicals or which contain up to about 30 mol % of substituted radicals, based on the polymer.

In order to prepare the copolyamides comprising the recurring structural units Ia, Ib, Ic and Id, a dicarboxylic acid dichloride of the formula VIII is appropriately reacted with a mixture of the divines of the formulae IX, X, XI and XII

  (VIII)

  (IX)

  (X)

  (XI)

  (XII)

in which the radicals $R^1$ to $R^5$ have the meaning defined further above.

The dicarboxylic acid dichloride of the formula VIII and the individual diamine types can also be used in the form of mixtures.

For this reaction, the proportions of the diamines IX, X, XI and XII are in each case to be chosen such that polyamides which have the above-defined proportions are formed from structural units of the formulae Ia to Id.

It is self-evident to a person skilled in the art that the sum of all structural units derived from aromatic acids and the sum of all structural units derived from aromatic amines are essentially identical, i.e. that they differ by at most about 1%, preferably by at most 0.2%, and in particular are identical within the framework of the practical measurement and metering possibilities.

The molecular weight of the polyamides formed can be controlled, inter alia, via the selection of the proportions of aromatic acids to aromatic amines. These selection criteria are known to those skilled in the art in the polycondensation field.

Examples of suitable aromatic dicarboxylic acids from which the dicarboxylic acid dichlorides of the formula VIII are derived are naphthalene-1,4-dicarboxylic acid, naphthalene-1,5-dicarboxylic acid, naphthalene-2,6-dicarboxylic acid, biphenyl-4,4'-dicarboxylic acid, 2-chloroterephthalic acid, 2-bromoterephthalic acid, 2-methylterephthalic acid and in particular terephthalic acid.

Up to 10 mol % of the dicarboxylic acid dichlorides can also be derived from divalent aromatic meta-radicals, Examples of acids from which such dicarboxylic acid dichlorides are derived are naphthalene-1,6-dicarboxylic acid, naphthalene-1,7-dicarboxylic acid, naphthalene-2,7-dicarboxylic acid, biphenyl-3,4'-dicarboxylic acid and in particular isophthalic acid.

p-Phenylenediamine is preferably used as a diamine of the formula IX.

m-Phenylenediamine is preferably used as a diamine of the formula X.

1,4-Bis-(4-aminophenoxy)-benzene is preferably used as a diamine of the formula XI.

Examples of particularly suitable diamines of the formula XII are 4,4'-diaminobenzanilide, 3,4'-diaminobenzanilide and 2-chloro-p-phenylenediamine. 2-Chloro-p-phenylenediamine is particularly preferred.

The copolycondensation of the monomer compounds described above is generally carried out as solution polymerization.

To this end, the aromatic monomer compounds to be reacted with one another are as a rule dissolved in an organic solvent. The organic solvent preferably comprises at least one solvent of the amide type, such as, for example, N-methyl-2-pyrrolidone, N,N-dimethylacetamide, tetramethylurea, N-methyl-2-piperidone, N,N'-dimethylethyleneurea, N,N,N',N'-tetramethylmaleimide, N-methylcaprolactam, N-acetylpyrrolidine, N,N-diethylacetamide, N-ethyl-2-pyrrolidone, N,N'-dimethylpropionamide, N,N-dimethylisobutylamide, N-methylformamide or N,N'-dimethylpropyleneurea. The preferred organic solvents N-methyl-2-pyrrolidone, N,N-dimethylacetamide and a mixture of these compounds are of importance for the process according to the invention.

In a preferred embodiment of the solution polymerization, the aromatic monomer diamines are dissolved in an amide solvent. The solution thus obtained is then mixed with the at least one aromatic monomer compound in the form of an aromatic dicarboxylic acid dihalide, with vigorous stirring, in order to initiate the copolymerization.

In this process the amide solvent is used not only as solvent for the aromatic monomer compounds and the aromatic copolyamide obtained therefrom but also as acid acceptor for a hydrogen halide, for example for hydrogen chloride, which is formed as a by-product of the copolymerization of the aromatic monomer compounds. In some cases it can be advantageous to use an additive which promotes the solubility, for example a metal halide of one of the metals of Group I or II of the Periodic Table, which halide is added to the copolymerization mixture before, during or after the copolymerization.

Examples of such additives are alkali metal halides, such as lithium chloride, or alkaline earth metal halides, such as calcium chloride.

The polycondensation temperatures for the solution polymerization are usually between −20° C. and +120° C., preferably between +10° C. and +100° C. Particularly good results are obtained with reaction temperatures of between +10° C. and +80° C.

The sum of the concentrations of the aromatic monomer compounds in the polymerization mixture solution can be adjusted taking into account the desired degree of polymerization, the desired viscosity of the polymerization mixture, the nature of the aromatic monomer compounds used, the nature of the solvent used and the desired polymerization temperature. The most favorable sum of the concentrations can be determined on the basis of a number of preliminary experiments for the course of the polymerization.

Polycondensation reactions are preferably carried out in such a way that 4 to 20, preferably 5 to 10, % by weight of polycondensation product are present in the solution after the reaction is complete. Particularly good results are obtained with concentrations of 5.0 to 7.5% by weight.

The molecular weight of the polymer, and thus also the viscosity of the reaction batch, increase in the course of the polycondensation reaction.

An adequate molecule chain length is reached if the viscosity of the polymer solution obtained from the polycondensation reaction corresponds to an inherent viscosity of the polymer of about 2.5 to 7.0 dl/g.

Inherent viscosity is understood to mean the expression $$\eta_{inh} = \frac{\ln \eta_{rel}}{c}.$$

In this expression, $\eta_{rel}$ is the relative viscosity and c the concentration used, in g/100 ml.

For the purposes of the present invention, it is determined for 0.25% strength solutions of polymer in N-methylpyrrolidone at 25° C.

Insofar as it is used to prepare the aromatic polyamides according to the invention which have been described above, the process for the preparation of aromatic polyamides which has been outlined and is known per se is also a subject of the invention.

If the polymer solution has reached the viscosity required for further processing, the polycondensation reaction can be stopped in the conventional manner by adding monofunctional compounds, such as, for example, acetyl chloride. The hydrogen chloride formed, which is bound in salt form to the amide solvent, can then be neutralized by adding basic substances.

Substances suitable for this purpose are, for example, lithium hydroxide and calcium hydroxide, but in particular calcium oxide.

The aromatic copolyamide obtained on carrying out the process according to the invention can be separated off from the copolymerization mixture by means of a separation process, for example by precipitation. In order to prepare a solution for shaping the copolyamide, the aromatic copolyamide obtained in this way is then dissolved in a suitable organic solvent, this process being designated the dissolving process for the preparation of the shaping solution.

However, in those cases in which the solution polymerization process is used to prepare the aromatic copolyamide according to the invention, the copolyamide is completely dissolved in the solvent for the polymerization, because it is outstandingly soluble in said solvent. Therefore, if the process according to the invention is used industrially it is advantageous to use the mixture obtained from the polymerization immediately as shaping solution for the aromatic copolyamide.

The aromatic copolyamide according to the invention is outstandingly soluble in an organic solvent, for example in organic solvents of the amide type, and has outstanding resistance to heat and superior resistance to chemicals. The aromatic copolyamide according to the invention is particularly useful for the production of diverse shaped articles, for example fibers, films and coatings, which are likewise a subject of the invention.

Within the framework of this description the term "fibers" is to be understood in its broadest meaning; thus, the term also covers, for example, filaments or staple fibers of any desired denier.

Within the framework of this description, the term "films" is likewise to be understood in its broadest meaning; thus, it also covers, for example, embodiments of diverse thickness, such as sheets or membranes.

The shaped structures not only have outstanding resistance to heat and resistance to chemicals but also have superior mechanical properties, for example in respect of the tensile strength, the abrasion resistance and the modulus of elasticity. The solution of the aromatic copolyamide can also be used in diverse ways, for example for the production of fibers, sheets, sheet-like elements, fibrous materials and other shaped articles.

The solvent used in the process for the preparation of the shaping solution of the aromatic copolyamide is preferably a solvent of the amide type, in particular the solvents of the amide type which have been mentioned further above, or a mixture of two or more of the said compounds.

For the preparation of the shaping solution it is advantageous if the concentration of the aromatic copolyamide is kept within a range between 4 and 15% by weight, in particular between 5 and 10% by weight. If necessary, the shaping solution can comprise an additive to promote the solubility, it being possible to use at least one metal halide of a metal of Groups I and II of the Periodic Table, for example lithium chloride, calcium chloride or magnesium bromide, specifically in a concentration of between 0.2 and 10%, preferably of between 0.5 and 5%, with respect to the total weight of the shaping solution. The additive to promote the solubility also promotes the stability of the shaping solution at elevated temperature.

Shaping of the shaping solution to give a shaped article can be carried out by any suitable dry process, wet process or dry/wet process. In the cases in which a wet process is used in order to shape the shaping solution, for example to give filaments, the shaping solution or—in this case—the spinning solution is extruded through a die, for example a spinneret, into a coagulating liquid. With this procedure it is usually advantageous if the coagulation liquid is composed of water or of an aqueous solution containing a polar organic solvent. The polar organic solvent can be selected from the same amide solvents which are customarily used for dissolving the aromatic copolyamide.

The polar organic solvent used in the coagulation liquid is preferably the same solvent as is contained in the shaping solution. The coagulation liquid is preferably used at a temperature between 0° C. and the boiling point of the coagulation liquid under atmospheric pressure.

The polar organic solvent is preferably present in the coagulation liquid in a concentration of less than 70% by weight, in particular less than 50% by weight.

The shaping process explained above is particularly suitable for the production of films or fibers from a shaping solution.

When producing fibers from the aromatic copolyamide, the shaping or spinning solution is extruded through a spinning head which has multiple spin orifices, the filament-form streams of the spinning solution being solidified in one of the coagulation liquids indicated above (wet process) or in an atmosphere promoting evaporation (dry process). A variant which is also suitable is the "dry jet/wet spinning process", as is described, for example, in U.S. Pat. No. 34 14 645. A conventional horizontal or vertical wet spinning machine, a dry jet wet spinning machine or a spinning machine in which the material flow is downward under stress can be used for spinning.

In the case of wet spinning of an aromatic copolyamide according to the invention, the coagulation is preferably effected using a coagulation liquid containing an additive to promote coagulation, this coagulation being followed by a further coagulation step, in the course of which the coagulating filaments of the aromatic copolyamide are passed into a water bath which is kept at a temperature of between 0° and 100° C.

The additional coagulation step serves to complete the coagulation by removal of the solvent. In addition, additives to promote coagulation, if such substances are used, are washed out of the coagulated filaments.

It is clear from the above description that the aromatic copolyamide according to the invention can be processed to give filaments without any problems, using conventional spinning processes and equipment, without a hazardous or harmful solvent, such as, for example, concentrated sulfuric acid, having to be used.

Consequently, the risks for the operating personnel are reduced. In addition, the filaments produced from the copolyamide according to the invention have a dense internal structure.

The shaping solution can also be processed to give a film using conventional fanning or extruding processes.

Fibers or films which are produced by the shaping processes indicated above are usually subjected to a stretching operation, by means of which not only the mechanical properties, such as, for example, the tensile strength and the modulus of elasticity, but also the thermal properties, such as, for example, the stability to heat, of the filaments or films produced in this way are improved.

Filaments composed of the aromatic copolyamides according to the invention are as a rule stretched in order to obtain a high mechanical strength and a high modulus of elasticity. The stretching ratio is usually about 1:6 to 1:20. The stretching temperature is as a rule between 250° and 500° C., preferably between 300° and 450° C.

Stretching can be carried out in a single step, in two steps or in several steps and a hotplate or a cylindrical heating device can be used for heating. In addition, the stretched filaments or films can be subjected to a further heat treatment at the same temperature or a higher temperature in order to improve the crystalline structure. In this context it is pointed out that the aromatic copolyamide according to the invention is not only surprisingly advantageous with respect to its solubility in conventional organic solvents but can also be stretched under "mild" operating conditions without any problems after the production of the fibers or films.

The fibers composed of an aromatic copolyamide according to the invention, which have outstanding mechanical and thermal properties and are distinguished by a high stretchability, can be used industrially in very diverse ways, for example for reinforcing plastics, in particular as reinforcing materials for the fabric inserts in car tires and other rubber articles, as heat-resistant insulating materials, for the production of filter fabrics and as lightweight insulating materials. Films composed of an aromatic copolyamide according to the invention can be used as heat-resistant electrical insulating materials or for the production of membranes.

Further features and advantages of the invention are explained in more detail below with the aid of examples.

However, it is to be understood that the invention is not restricted to the illustrative examples. On the contrary, numerous possibilities for modifications and/or supplements are available to a person skilled in the art, taking the illustrative examples as a basis, without having to go beyond the basic concept of the invention.

EXAMPLE 1

Aromatic copolyamide obtained from 100 mol % of terephthalic acid dichloride, 50 mol % of p-phenylenediamine, 20 mol % of m-phenylenediamine, 20 mol % of 1,4-bis-(4-aminophenoxy)-benzene and 10 mol % of 2-chloro-p-phenylenediamine 51.37 g (0.475 mol) of p-phenylenediamine, 20.55 g (0.19 mol) of m-phenylenediamine, 55.53 g (0.19 mol) of 1,4-bis-(aminophenoxy)-benzene and 13.55 g (0.095 mol) of 2-chloro-p-phenylenediamine are dissolved in 4036 g of N-methylpyrrolidone (NMP) under nitrogen, and 192.87 g (0.95 mol) of terephthalic acid dichloride are added at 14° C. When the desired viscosity is reached, the condensation is stopped by adding 1.54 g of acetyl chloride, and neutralization is then effected with 107.6 g of a 59% strength calcium oxide suspension in NMP. The solution is filtered, degassed and wet-spun. For this purpose, it is spun from a spinneret having 100 orifices of 0.1 mm diameter each into a coagulation bath consisting of a solution, at 80° C., of 35% of N-methylpyrrolidone in water, at a rate of 14 m/min. The filaments obtained are stretched to 10 times their length through two water baths, a washing machine, via a drying godet and finally over a hot plate at a temperature of 420° C.

The filament linear density is 1.47 dtex for a fineness-related strength of 148 cN/tex, an elongation of 5% and an initial modulus of 32 N/tex, with respect to 100% elongation.

EXAMPLES 2 to 6

Further aromatic copolyamides are produced, spun and tested in accordance with the procedure described in Example 1. The diamines used, the proportions thereof, the solution viscosities of the resulting polymers, the spinning conditions and properties of the resulting fibers are given in Table 1 below. The following abbreviations are used for the diamines in Table 1:
TPC = terephthalic acid dichloride
PPD = p-phenylenediamine
MPD = m-phenylenediamine
BAPOB = 1,4-bis-(4-aminophenoxy)-benzene
Cl-PPD = chloro-para-phenylenediamine
DABA = 4,4'-diaminobenzanilide

| Example No. | 2 | 3 | 4 | 5 | 6 |
|---|---|---|---|---|---|
| TPC (mol %) | 100 | 100 | 100 | 100 | 100 |
| PPD (mol %) | 50 | 50 | 50 | 50 | 50 |
| BAPOB (mol %) | 10 | 20 | 15 | 20 | 20 |
| MPD (mol %) | 30 | 20 | 20 | 20 | 25 |
| Cl—PPD (mol %) | | | | 10 | 5 |
| DABA (mol %) | 5 | 10 | 15 | | |
| Filament linear density (dtex) | 2.99 | 1.76 | 1.74 | 1.56 | 1.36 |
| Tensile strength (cN/tex) | 86 | 122 | 130 | 149 | 95 |
| Elongation (%) at break | 4 | 4.9 | 3.9 | 5 | 4.7 |
| Modulus of elasticity (N/tex) | 27 | 31 | 40 | 34 | 24 |
| Stretching ratio 1: | 4 | 6 | 5.6 | 10 | 7.5 |
| Inherent viscosity (dl/g)* | 5.64 | 6.10 | 5.09 | 5.92 | 6.10 |

*at 25° C. in NMP

What is claimed is:

1. An aromatic copolyamide which is soluble in organic polyamide solvents and contains the recurring structural units of the formulae Ia, Ib, Ic and Id

[—OC—R$^1$—CO—NH—R$^2$—NH—]    (Ia),

[—OC—R$^1$—CO—NH—R$^3$—NH—]    (Ib),

[—OC—R$^1$—CO—NH—R$^4$—NH—]    (Ic),

[—OC—R$^1$—CO—NH—R$^5$—NH—]    (Id), in which 90 to 100 mol % of all radicals R$^1$, with respect to the amount of these radicals in the copolymer, are a divalent aromatic radical, the valency bonds of which are in the para-position or in a comparable coaxial or parallel position with respect to one another, and which is unsubstituted or substituted by one or two inert radicals, and 0 to 10 mol % of all radicals R$^1$, with respect to the amount of these radicals in the copolymer, are a divalent aromatic radical, the valency bonds of which are in the meta-position or in a comparable angled position with respect to one another, and which is unsubstituted or substituted by one or two inert radicals, R$^2$ is a divalent aromatic radical, the valency bonds of which are in the para-position or in a comparable coaxial or parallel position with respect to one another, and which is unsubstituted or substituted by one or two inert radicals, and R$^3$ is a radical of the formula II

(II)

R$^4$ is a radical of the formula III
—Ar$^1$—O—Ar$^1$—O—Ar$^1$—    (III), and

R$^5$ is a radical of the formula IV or V or a combination thereof

(IV)

-continued

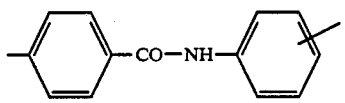
(V)

in which Ar¹ has one of the meanings defined for R², Y is hydrogen, a halogen atom, a lower alkyl group or a lower alkoxy group, X is a halogen atom, a lower alkyl group or a lower alkoxy group, and the proportion of recurring structural units Ia, Ib, Ic and Id, with respect to the sum of these structural units in the copolymer, is within the following limits:

recurring structural unit of the formula Ia: 30 to 70 mol %;

recurring structural unit of the formula Ib: 15 to 40 mol %;

recurring structural unit of the formula Ic: 5 to 30 mol %; and recurring structural unit of the formula Id: 5 to 30 mol %.

2. The aromatic copolyamide as claimed in claim 1, wherein 90 to 100 mol % of all radicals R¹, are 1,4-phenylene and 0 to 10 mol % of all radicals R¹ are 1,3-phenylene.

3. The aromatic copolyamide as claimed in claim 2, wherein 100 mol % of the radicals R¹ are 1,4-phenylene.

4. The aromatic copolyamide as claimed in claim 1, wherein R² is 1,4-phenylene.

5. The aromatic copolyamide as claimed in claim 1, wherein Ar¹ is 1,4-phenylene.

6. The aromatic copolyamide as claimed in claim 1, wherein Y is hydrogen, chlorine, bromine, methyl or methoxy and X is chlorine, bromine, methyl or methoxy.

7. The aromatic copolyamide as claimed in claim 1, wherein R⁵ is a radical of the formula IV.

8. The aromatic copolyamide as claimed in claim 1, wherein the proportion of recurring structural units Ia, Ib, Ic and Id, with respect to the sum of these structural units in the copolymer, is within the following limits:

recurring structural unit of the formula Ia: 40 to 60 mol %;

recurring structural unit of the formula Ib: 20 to 30 mol %;

recurring structural unit of the formula Ic: 10 to 20 mol %; and recurring structural unit of the formula Id: 10 to 20 mol %.

9. A shaped structure comprising an aromatic copolyamide as claimed in claim 1.

10. The shaped structure as claimed in claim 9, which is a fiber, film or coating.

* * * * *